United States Patent
Schaefer et al.

(10) Patent No.: US 11,780,967 B2
(45) Date of Patent: *Oct. 10, 2023

(54) PROCESS FOR PREPARING OXAMIDE-FUNCTIONAL SILOXANES

(71) Applicant: WACKER CHEMIE AG, Munich (DE)

(72) Inventors: Oliver Schaefer, Burghausen (DE); Katja Huettl, Julbach (DE)

(73) Assignee: Wacker Chemie AG, Munich (DE)

( * ) Notice: Subject to any disclaimer, the term of this patent is extended or adjusted under 35 U.S.C. 154(b) by 135 days.

This patent is subject to a terminal disclaimer.

(21) Appl. No.: 17/264,483

(22) PCT Filed: Jul. 30, 2018

(86) PCT No.: PCT/EP2018/070598
§ 371 (c)(1),
(2) Date: Jan. 29, 2021

(87) PCT Pub. No.: WO2020/025100
PCT Pub. Date: Feb. 6, 2020

(65) Prior Publication Data
US 2021/0238360 A1    Aug. 5, 2021

(51) Int. Cl.
C08G 77/06 (2006.01)
C08G 77/16 (2006.01)
C08G 77/08 (2006.01)
C08G 77/26 (2006.01)

(52) U.S. Cl.
CPC ............ C08G 77/16 (2013.01); C08G 77/08 (2013.01); C08G 77/26 (2013.01)

(58) Field of Classification Search
CPC ...... C08G 77/26; C08G 77/388; C08G 77/06; C07F 7/081; C07F 7/083; C07F 7/0874
USPC ...................................................... 556/419
See application file for complete search history.

(56) References Cited

U.S. PATENT DOCUMENTS

| | | | | |
|---|---|---|---|---|
| 3,036,035 A * | 5/1962 | Riley | ..... | C07F 7/0874 528/21 |
| 3,746,738 A * | 7/1973 | Pepe et al. | ..... | C07F 7/1804 521/154 |
| 4,888,405 A * | 12/1989 | Gamon | ..... | C08G 77/32 528/33 |
| 5,380,902 A * | 1/1995 | Hager | ..... | C08G 77/08 528/21 |
| 5,663,262 A * | 9/1997 | Shirakawa | ..... | C08F 12/26 525/218 |
| 7,501,184 B2 * | 3/2009 | Leir | ..... | B32B 7/12 428/447 |
| 8,614,281 B2 * | 12/2013 | Hansen | ..... | C09D 183/04 525/474 |
| 10,800,886 B2 * | 10/2020 | Schäafer | ..... | C08G 77/26 |
| 11,028,232 B2 * | 6/2021 | Schaefer | ..... | C08G 77/26 |
| 2007/0149745 A1 | 6/2007 | Leir et al. | | |
| 2013/0011673 A1 | 1/2013 | Hansen et al. | | |
| 2019/0315927 A1* | 10/2019 | Schäfer | ..... | B01J 31/0265 |
| 2020/0317868 A1* | 10/2020 | Schaefer | ..... | C07F 7/188 |

FOREIGN PATENT DOCUMENTS

EP    1963404 B1    4/2011

* cited by examiner

*Primary Examiner* — Margaret G Moore
(74) *Attorney, Agent, or Firm* — BROOKS KUSHMAN P.C.

(57) ABSTRACT

Oxamide-functional siloxanes are prepared by reacting (A) silanes of the general formula (I)

$$R^2-O-\overset{O}{\underset{\|}{C}}-\overset{O}{\underset{\|}{C}}-\overset{R^x}{\underset{|}{N}}-Y-Si(R^1)_n(OR^3)_{3-n}$$

with
(B) siloxanes selected from
(B1) linear siloxanes of the general formula
$$HO[SiR_2O]_xH \qquad (II)$$
and
(B2) cyclic compounds of the general formula
$$(SiR^4_2O)_s \qquad (III),$$
in the presence of
(C) catalysts.

14 Claims, No Drawings

PROCESS FOR PREPARING OXAMIDE-FUNCTIONAL SILOXANES

CROSS REFERENCE TO RELATED APPLICATIONS

This application is the U.S. National Phase of PCT Appln. No. PCT/EP2018/070598 filed Jul. 30, 2018, the disclosure of which is incorporated in its entirety by reference herein.

BACKGROUND OF THE INVENTION

1. Field of the Invention

The invention relates to a process for preparing oxamide-functional siloxanes.

2. Description of the Related Art

Oxamide-functional polysiloxanes are usable in many fields of application, but especially for the production of block copolymers of thermoplastic siloxanes, as described, for example, in EP-A 1 963 404. The preparation of such oxamide-functional siloxanes is known in principle and has been described in US-A 2007/0149745. In this case, starting products are bisaminoalkyl-functional siloxanes which can be prepared by various methods. These bisaminoalkyl-functional siloxanes are preferably reacted with dialkyl oxalates, present in excess, to give the desired substituted amino-oxo-acetate-functional siloxanes, referred to more simply hereafter as oxamide-functional siloxanes. For the further reaction of these products, the excess of dialkyl oxalates present in the reaction mixture generally also has to be removed, which is done primarily by means of discontinuous vacuum distillation. There are, however, a few disadvantages with the process described. For instance, the degree of functionalization of the oxamide-functional siloxanes primarily depends on the degree of functionalization of the bisaminoalkyl siloxanes used as the feedstock, which, however, can be prepared with a functionality of >99% only with relatively great effort. Furthermore, it is necessary for avoiding secondary reactions, to employ the dialkyl oxalates in relatively large excess, which in turn entails complicated and expensive removal of these dialkyl oxalates, since these are in some cases toxic. A third major disadvantage is the fact that commercially available dialkyl oxalates, such as, for example, diethyl oxalate, also contain impurities which when reacted with bisamino-functional siloxanes lead to sometimes very strongly colored products, which have to be laboriously decolorized in a further step when the further use requires optically clear and colorless products. A further disadvantage is that when preparing high-molecular-weight oxamide-functional siloxanes, correspondingly high-molecular-weight aminosilicone precursors are used, the high viscosity of which, especially during filling of the reactors, leads to long filling times and therefore long down times, which increases the costs for preparing these products unnecessarily. Likewise, for the preparation of oxamide-functional siloxanes of different chain length, the availability of corresponding aminosiloxane precursors is mandatory.

A simple route was therefore sought for obtaining oxamide-functional high-purity polydimethylsiloxanes having a high degree of functionalization in a process that is as simple and as rapid as possible.

SUMMARY OF THE INVENTION

It has surprisingly now been found that, despite the presence of chemically reactive groups such as amide or ester groups, oxamide-functional polydimethylsiloxanes were able to be prepared by means of an acid- or base-catalyzed equilibration reaction in which only very low amounts of catalysts are sufficient for catalyzing the equilibration reaction.

DETAILED DESCRIPTION OF THE PREFERRED EMBODIMENTS

The invention provides a process for preparing amino-oxo-acetate-functional organosiloxanes by reacting
(A) silanes of the general formula (I)

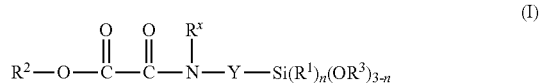

with
(B) siloxanes selected from
(B1) linear siloxanes of the general formula

and
(B2) cyclic compounds of the general formula

where
R can be identical or different and denotes a hydrogen atom or monovalent, optionally substituted, SiC-bonded hydrocarbon radicals which can be interrupted by heteroatoms, preferably an oxygen atom,
$R^1$ can be identical or different and denotes monovalent, optionally substituted, SiC-bonded hydrocarbon radicals which can be interrupted by heteroatoms, preferably an oxygen atom,
Y can be identical or different and represents divalent, optionally substituted hydrocarbon radicals which can be interrupted by oxygen atoms,
$R^2$ can be identical or different and denotes a hydrogen atom, monovalent, optionally substituted hydrocarbon radicals which can be interrupted by oxygen atoms,
$R^3$ can be identical or different and denotes monovalent, optionally substituted hydrocarbon radicals which can be interrupted by oxygen atoms,
$R^4$ can be identical or different and denotes a hydrogen atom, a Si-bonded halogen atom, a Si-bonded hydroxy group or monovalent, optionally substituted, SiC-bonded hydrocarbon radicals which can be interrupted by heteroatoms, preferably an oxygen atom,
$R^x$ can be identical or different and denotes a hydrogen atom or optionally substituted hydrocarbon radicals,
n is 0, 1 or 2, preferably 2,
s is an integer from 3 to 10, preferably 4 or 5, and
t is an integer greater than 1, preferably an integer from 8 to 150,
in the presence of
(C) catalysts.

Examples of hydrocarbon radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl, and 2-propenyl radicals; aryl radicals such as the phenyl, naphthyl, anthryl and phenanthryl radicals; alkaryl radicals such as o-, m-, p-tolyl radicals, xylyl radicals and ethylphenyl radicals; or aralkyl radicals such as the benzyl radical or the α- and the β-phenylethyl radicals.

Examples of substituted hydrocarbon radicals R are halogenated hydrocarbon radicals such as the chloromethyl, 3-chloropropyl, 3-bromopropyl, 3,3,3-trifluoropropyl and 5,5,5,4,4,3,3-heptafluoropentyl radical, and also the chlorophenyl radical; hydroxyalkyl radicals such as the hydroxypropyl radical; or epoxide radicals such as the glycidyloxypropyl radical.

By preference, radical R denotes a monovalent hydrocarbon radical optionally substituted by halogen atoms or hydroxy groups and having 1 to 20 carbon atoms, more preferably a hydrocarbon radical having 1 to 6 carbon atoms, yet more preferably an aliphatic hydrocarbon radical having 1 to 6 carbon atoms, especially the methyl, ethyl or propyl radicals, and most preferably the methyl radical.

Examples of radical $R^1$ are the radicals specified for radical R.

By preference, radicals $R^1$ are SiC-bonded hydrocarbon radicals optionally substituted by halogen atoms or hydroxy groups and having 1 to 20 carbon atoms, more preferably a hydrocarbon radical having 1 to 6 carbon atoms, yet more preferably an aliphatic hydrocarbon radical having 1 to 6 carbon atoms, especially the methyl, ethyl or propyl radicals, and most preferably the methyl radical.

Examples of radical $R^2$ are the radicals specified for the radical R and also polyalkylene glycol radicals bonded via a carbon atom.

Radicals $R^2$ are preferably hydrocarbon radicals, more preferably hydrocarbon radicals having 1 to 6 carbon atoms, and especially the methyl, ethyl or propyl radical.

Examples of radical $R^3$ are the radicals specified for the radical R and also polyalkylene glycol radicals bonded via a carbon atom.

Radicals $R^3$ are preferably hydrocarbon radicals, more preferably hydrocarbon radicals having 1 to 6 carbon atoms, and especially the methyl, ethyl or propyl radical.

Examples of radical $R^4$ are the radicals specified for the radical R.

By preference, radicals $R^4$ are SiC-bonded hydrocarbon radicals optionally substituted by halogen atoms or hydroxy groups and having 1 to 20 carbon atoms, more preferably a hydrocarbon radical having 1 to 6 carbon atoms, yet more preferably an aliphatic hydrocarbon radical having 1 to 6 carbon atoms, especially the methyl, ethyl or propyl radicals, and most preferably the methyl radical.

As a result of the preparation process, radical $R^4$ may also denote Si-bonded halogen atoms, preferably chlorine atoms, or Si-bonded hydroxy radicals. As a result of the preparation process, siloxanes (B2) preferably contain radicals $R^4$ which are hydroxy groups, in amounts of at most 500 ppm by weight, based on the total weight of siloxane (B2).

Examples of radical Y are aliphatically saturated or unsaturated, straight-chain or branched radicals that may be substituted by halogen atoms.

Radical Y is preferably an alkylene radical having 3 to 6 carbon atoms that may optionally be substituted, especially by chlorine or fluorine. Radical Y is preferably a propylene or butylene radical, especially the propylene radical.

Examples of radical $R^x$ are the radicals specified for the radical R.

By preference, radicals $R^x$ are hydrogen atom or hydrocarbon radicals optionally substituted by —CN or -halogen, more preferably hydrogen or alkyl groups, yet more preferably hydrogen or linear alkyl groups having 1 to 6 carbon atoms, especially a hydrogen atom, the methyl or ethyl radical, and most preferably a hydrogen atom.

Examples of silanes (A) used according to the invention are Et-O—CO—CO—NH—$C_3H_6$—$SiMe_2$-OMe, Et-O—CO—CO—NH—$C_3H_6$—$SiMe_2$-OEt, Me-O—CO—CO—NH—$C_3H_6$—$SiMe_2$-OEt, Me-O—CO—CO—NH—$C_3H_6$—$SiMe_2$-OMe, Et-O—CO—CO—NH—$C_3H_6$—SiMe-$(OMe)_2$, Et-O—CO—CO—NH—$C_3H_6$—SiMe-$(OEt)_2$, Me-O—CO—CO—NH—$C_3H_6$—SiMe-$(OMe)_2$, Me-O—CO—CO—NH—$C_3H_6$—SiMe-$(OEt)_2$, Et-O—CO—CO—NH—$C_3H_6$—Si—$(OMe)_3$, Et-O—CO—CO—NH—$C_3H_6$—Si—$(OEt)_3$, Me-O—CO—CO—NH—$C_3H_6$—Si—$(OMe)_3$, Me-O—CO—CO—NH—$C_3H_6$—Si—$(OEt)_3$, where Me denotes a methyl radical and Et denotes an ethyl radical.

The silanes (A) used according to the invention are preferably those that are liquid at temperatures between 10 and 100° C. and a pressure of 1013 hPa, more preferably those that are liquid between 10 and 50° C. and a pressure of 1013 hPa.

The silanes (A) used according to the invention have an APHA color number that is preferably below 100, more preferably below 10.

The silanes (A) used according to the invention can be prepared by processes that are common in silicon chemistry.

As a result of the preparation process, the silanes (A) may in this case be present in a mixture with impurities, such as for example with amino-oxo-acetate-functional silanols. The silanes (A) used according to the invention preferably have a purity of >90% by weight, more preferably a purity >99% by weight, and especially a purity >99.5% by weight.

Within the context of the present invention, the APHA number is determined according to DIN ISO 6271-2, preferably by means of a LICO 500 machine from Hach-Lange. Here, the APHA measurement value takes into account not just the color but additionally also the turbidity value of the product measured.

Examples of siloxanes (B1) used according to the invention are $(HO)Me_2SiO[SiMe_2O]_{45}SiMe_2$ (OH), $(HO)MeViSiO[SiMe_2O]_{30}SiMeVi$ (OH) and $(HO)Me_2SiO[SiMe_2O]_{15}[SiMeVi]_2OSiMe_2$ (OH), where Me denotes a methyl radical, Et denotes an ethyl radical and Vi denotes a vinyl radical.

The component (B1) used according to the invention is preferably a linear siloxane having aliphatic substituents.

The component (B1) used according to the invention preferably has a viscosity of 5 to 10 000 mPas, more preferably 10 to 400 mPas, and most preferably of 15 to 150 mPas, in each case measured at 25° C.

Here, the viscosities are determined according to DIN 53019.

As a result of the preparation process, the siloxanes (B1) used according to the invention may have a molar proportion of branches, that is to say T and/or Q units, of preferably up to 1%, more preferably up to 1000 ppm; they especially do not have any branches.

As a result of the preparation process, the siloxanes (B1) may furthermore also be present in a mixture with impurities, such as for example water. The siloxanes (B1) used according to the invention preferably have a purity of >80% by weight, more preferably a purity >90% by weight, and especially a purity >99% by weight.

The organosilicon compounds (B1) are commercially available products or can be prepared by methods that are common in silicon chemistry.

Examples of siloxanes (B2) used according to the invention are octamethylcyclotetrasiloxane, hexamethylcyclotrisiloxane, decamethylcyclopentasiloxane, dodecamethylcyclohexasiloxane and also mixtures thereof.

The component (B2) used according to the invention is preferably octamethylcyclotetrasiloxane, hexamethylcyclotrisiloxane or decamethylcyclopentasiloxane, more preferably octamethylcyclotetrasiloxane.

As a result of the preparation process, the siloxanes (B2) used according to the invention may have a molar proportion of branches, that is to say T and/or Q units, of preferably up to 1%, more preferably up to 1000 ppm; they especially do not have any branches.

The organosilicon compounds (B2) are commercially available products or can be prepared by methods that are common in silicon chemistry.

In the process according to the invention, linear siloxanes (B1), cyclic compounds (B2) or mixtures thereof are used as component (B). Component (B) preferably consists of linear siloxanes (B1).

The mass ratio between the siloxanes (B) and the component (A) can vary within broad ranges in the process according to the invention and is primarily determined by the desired molecular weight of the compounds that are to be prepared by the process according to the invention.

In the process according to the invention, component (B) is preferably used in amounts of 10 to 200 parts by weight, more preferably 30 to 150 parts by weight, based in each case on 1 part by weight of component (A).

Catalysts (C) that can be used are the same catalysts that could be used in previously described equilibration processes, such as strong acids or strong bases. The catalysts (C) used may be in solid form or else in liquid form under the conditions of the process.

Catalysts (C) are preferably strong acids, such as HCl, sulfuric acid, sulfonic acids or else phosphonitrile chloride ($PNCl_2$) or oligomeric or polymeric analogs thereof, or else strong bases, such as NaOH, KOH, CsOH, RbOH, ammonium hydroxides or else phosphazene bases, such as for example t-Bu P4 base (Schwesinger base).

Catalysts (C) are preferably phosphorus-containing catalysts, such as for example phosphazene bases or phosphonitrile chloride ($PNCl_2$).

Catalysts (C) are preferably used in amounts of 10 to 10,000 ppm by weight, more preferably of 10 to 2000 ppm by weight, based in each case on the total amount of components (A) and (B).

After termination of the reaction according to the invention, the catalysts (C) can, depending on the nature, amount used or intended use of the end product, remain in the end product either in neutralized form or else in non-neutralized form, or they can be neutralized by known methods, such as by adsorption on basic oxides, such as aluminum oxide, magnesium oxide, or basic salts, such as carbonates or hydrogencarbonates, and optionally filtered off.

The process according to the invention can be conducted in the presence or absence of solvents (D). If solvents (D) are used, they are preferably aprotic solvents, more preferably aprotic solvents or solvent mixtures having a boiling range from 80 to 160° C. at 0.1 MPa. The designation of "solvent" does not mean that all reaction components have to dissolve therein. The presence of solvent (D) may serve, inter alia, to reduce the viscosity of the desired end products so that they can be conveyed or pumped more readily with technical means.

Preferred examples of optionally used aprotic solvents (D) are aliphatic hydrocarbons such as hexane, heptane or decane, aromatic hydrocarbons such as toluene or xylene, and also ethers such as tetrahydrofuran (THF), diethyl ether and methyl tert-butyl ether (MTBE).

If solvents (D) are used in the process according to the invention, the amount should preferably be sufficient to ensure adequate homogenization of the reaction mixture.

If solvents (D) are used in the process according to the invention, amounts are preferably from 20 to 80% by weight, more preferably 20 to 50% by weight, based in each case on the total weight of all components used. Preferably, no solvents (D) are used in the process according to the invention.

In the process according to the invention, the proportion of components (A) to (D) in the total amount of substances used is preferably at least 90% by weight, more preferably at least 95% by weight.

In the process according to the invention, preferably no further constituents are used besides the components (A) to (D) and any preparation-related impurities thereof that may be present.

In one preferred embodiment of the process according to the invention, (A) silanes of the formula (I), where $R^1$ is a methyl radical, $R^3$ is a methyl radical or ethyl radical, $R^X$ is a hydrogen atom, n is 2, Y is $—C_3H_6—$ and $R^2$ is an ethyl radical, are reacted with (B1) linear siloxanes of the formula (II), where R is a methyl radical and t is an integer from 25 to 40, in the presence of catalyst (C).

The components used in the process according to the invention may in each case be one type of a component of this kind or else a mixture of at least two types of a particular component.

In the process according to the invention, the reactants used can be mixed with one another in any desired manner known to date. While the order when mixing the constituents (A), (B), (C) and optionally (D) is not critical, it has in practice proved beneficial to add the catalyst (C) preferably last to the mixture of the other constituents. The catalyst (C) can also be added here as a premix in a solvent (D) or in one of the components (A) and (B), preferably in the component (B), especially in order to facilitate correct metering of the catalyst (C).

The process according to the invention is preferably conducted under protective gas, such as for example nitrogen or argon, more preferably under nitrogen.

The selection of a suitable reactor for carrying out the process according to the invention is determined essentially by the viscosity of the reactants used and the viscosity of the expected product. Besides conventional stirred tanks, in the case of high-molecular-weight products it is also possible here to use, inter alia, kneaders for carrying out the process.

The process according to the invention is preferably conducted at temperatures between 0 and 250° C., more preferably between 40 and 150° C., and most preferably between 50 and 120° C. At the same time, the process according to the invention is preferably conducted at pressures between 10 hPa and 2000 hPa, but more preferably at pressures between 100 hPa and 1100 hPa, especially at the pressure of the surrounding atmosphere, that is to say at 900 to 1100 hPa.

After reaction is complete, the thus obtained product mixture is worked up in a manner known per se. The condensation products possibly forming in the process according to the invention, such as for example water or else cyclic siloxanes, are preferably removed at elevated temperature and/or reduced pressure.

The amounts of cyclic siloxane products possibly remaining in the product mixture obtained according to the invention are preferably below 1% by weight, more preferably below 0.5% by weight, and most preferably below 0.1% by weight. In particular, the low-molecular-weight cyclic siloxanes of the general formula (III), where n=3 to 5, can be removed by downstream continuous or discontinuous vacuum distillation at temperatures and pressures known in the prior art.

The process according to the invention may be conducted in a batchwise, semi-continuous or fully continuous manner.

The process according to the invention yields functional siloxanes which for example are used for coating fibers such as wool, cotton or textiles, or may be used for coating leather goods or as lubricants in mechanical engineering. In addition, the functional siloxanes prepared according to the invention may also be used in the production of polymers or in the modification of polymers.

The siloxanes prepared according to the invention preferably have an APHA color number of 0 to 100, more preferably of 0 to 20, and most preferably of 0 to 10.

The siloxanes prepared according to the invention preferably have an average molecular weight (number average $M_n$) of 1000 g/mol to 200,000 g/mol, more preferably of 2500 g/mol to 50,000 g/mol and most preferably of 10,000 to 45,000 g/mol.

The average molecular weight (number average $M_n$) of the end product is determined here primarily by the particular ratio of the reactants used according to the invention.

Within the context of the present invention, the number average molar mass $M_n$ is measured by means of size exclusion chromatography (SEC) against a polystyrene standard in THF at 60° C., flow rate 1.2 ml/min and detection with RI (refractive index detector) on a Styragel HR3-HR4-HR5-HR5 column set from Waters Corp. USA using an injection volume of 100 μl.

The process according to the invention has the advantage that it is simple and quick to carry out, with the possibility of using simple starting products.

The process according to the invention has the advantage that alkyloxalatoaminoalkyl-functional siloxanes (oxamide-functional siloxanes) are obtained in high purity, especially without turbidity and yellowing.

The process according to the invention additionally has the advantage that readily accessible, favorable and easy-to-process reactants can be used here.

In the examples described below, all specified parts and percentages relate, unless otherwise indicated, to weight. In addition, all viscosity data relate to a temperature of 25° C. and a shear rate of 1 s$^{-1}$. Unless otherwise specified, the following examples are conducted at a pressure of the surrounding atmosphere, that is to say approximately 1010 hPa, and at room temperature, that is to say at approximately 20° C., or at a temperature that is established when combining the reactants at room temperature without additional heating or cooling.

The following examples are conducted in the presence of nitrogen as protective gas.

The molecular weights specified in the examples are number average molecular weights $M_n$. The content of by-products and the average molecular weights $M_n$ are evaluated by NMR spectroscopy. Here, the average chain length, the residual Si—OH contents, contents of cycles and contents of dimeric by-products are determined by $^{29}$Si NMR.

Viscosities were measured by means of a cone-plate viscometer from Anton-Paar.

Me denotes a methyl radical.

The following reactants are used:

Silane 1:

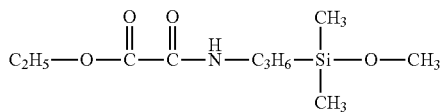

Silane 2:

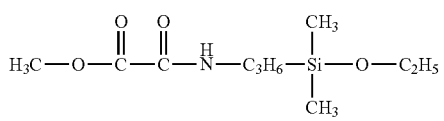

Siloxane 1:
Bishydroxy-terminated polydimethylsiloxane HO[SiMe$_2$O]$_{32.3}$H having an average molecular weight $M_n$ of 2408 g/mol and a water content of 370 ppm.

Siloxane 2:
Bishydroxy-terminated polydimethylsiloxane HO[SiMe$_2$O]$_{10.6}$H having an average molecular weight $M_n$ of 802 g/mol and a water content of 430 ppm.

Siloxane 3:
Bishydroxy-terminated polydimethylsiloxane HO[SiMe$_2$O]$_{144.3}$H having an average molecular weight $M_n$ of 10,696 g/mol and a water content of 220 ppm.

Siloxane 4:
Octamethylcyclotetrasiloxane (SiMe$_2$O)$_4$, distilled, water content <40 ppm.

Catalyst 1:
(PNCl$_2$)$_n$, 100%, linear poly-phosphonitrile chloride, CAS No.: 1832-07-1, obtainable from Silar, Wilmington N.C., USA under the product number 1996.

Example 1

400 g of siloxane 1 were mixed at room temperature with 10.46 g of silane 1 and 20 mg of catalyst 1. In a first step, the reaction mixture was degassed at 20° C. for 10 minutes and 250 hPa while stirring. Subsequently, the mixture was heated to 100° C. and stirred at a pressure of 2 hPa for 2 h. Finally, the mixture was cooled to 22° C. and vented with nitrogen. In a final step, 1.0 g of magnesium oxide was added, the mixture was stirred for 20 minutes and the magnesium oxide was filtered off. A colorless, clear, transparent bisethyloxalatoaminopropyl-functional silicone oil was obtained having an APHA number of 5, a viscosity of 1340 mPas, an average molecular weight $M_n$ of 18,760 g/mol and a residual Si—OH content of 75 ppm.

Example 2

400 g of siloxane 1 were mixed at room temperature with 20.92 g of silane 1 and 20 mg of catalyst 1. In a first step, the reaction mixture was degassed at 20° C. for 10 minutes and 250 hPa while stirring. Subsequently, the mixture was heated to 100° C. and stirred at a pressure of 2 hPa for 2 h. Finally, the mixture was cooled to 22° C. and vented with nitrogen. In a final step, 1.0 g of magnesium oxide was added, the mixture was stirred for 20 minutes and the magnesium oxide was filtered off. A colorless, clear, transparent bisethyloxalatoaminopropyl-functional silicone oil was obtained having an APHA number of 6, a viscosity of 340 mPas, an average molecular weight $M_n$ of 9763 g/mol and a residual Si—OH content of 82 ppm.

Example 3

400 g of siloxane 1 were mixed at room temperature with 5.23 g of silane 1 and 30 mg of catalyst 1. In a first step, the reaction mixture was degassed at 20° C. for 10 minutes and 250 hPa while stirring. Subsequently, the mixture was heated to 120° C. and stirred at a pressure of 2 hPa for 3 h. Finally, the mixture was cooled to 22° C. and vented with nitrogen. A colorless, clear, transparent bisethyloxalatoaminopropyl-functional silicone oil was obtained having an APHA number of 3, a viscosity of 11 Pas, an average molecular weight $M_n$ of 38,672 g/mol and a residual Si—OH content of 62 ppm.

Example 4

200 g of siloxane 1 and 200 g of siloxane 4 were mixed at room temperature with 12.52 g of silane 1 and 25 mg of catalyst 1. In a first step, the reaction mixture was degassed at 20° C. for 10 minutes and 250 hPa while stirring. Subsequently, the mixture was heated to 100° C. and stirred at a pressure of 500 hPa for 3 h. Thereupon, the mixture was stirred further at a pressure of 10 hPa for 3 h. Finally, the mixture was cooled to 22° C. and vented with nitrogen. In a final step, 1.0 g of magnesium oxide was added, the mixture was stirred for 20 minutes and the magnesium oxide was filtered off. A colorless, clear, transparent bisethyloxalatoaminopropyl-functional silicone oil was obtained having an APHA number of 3, a viscosity of 810 mPas, an average molecular weight $M_n$ of 15,300 g/mol and a residual Si—OH content of 37 ppm. The content of remaining siloxane cycles was below 1000 ppm.

Example 5

500 g of siloxane 1 were mixed at room temperature with 15.0 g of silane 2 and 52 mg of catalyst 1. After evacuating the air for 10 minutes while stirring at 20° C., the mixture was subsequently heated at a pressure of 4 mbar for 3 h to 90° C. After the 3 h, the mixture was heated further for 30 minutes to 100° C., subsequently cooled to 22° C. and vented. Next, 1.0 g of magnesium oxide was added, the mixture was stirred for 20 minutes and the magnesium oxide was filtered off. A colorless, clear, transparent bisethyloxalatoaminopropyl-functional silicone oil was obtained having an APHA number of 3, a viscosity of 680 mPas, an average molecular weight $M_n$ of 13,720 g/mol and a residual Si—OH content of 74 ppm.

Example 6

400 g of siloxane 3 were mixed at room temperature with 10.52 g of silane 1 and 30 mg of catalyst 1. In a first step, the reaction mixture was degassed at 20° C. for 10 minutes and 250 hPa while stirring. Subsequently, the mixture was heated to 100° C. and stirred at a pressure of 2 hPa for 2 h. Finally, the mixture was cooled to 22° C. and vented with nitrogen. In a final step, 1.0 g of magnesium oxide was added, the mixture was stirred for 20 minutes and the magnesium oxide was filtered off. A colorless, clear, transparent bisethyloxalatoaminopropyl-functional silicone oil was obtained having an APHA number of 5, a viscosity of 1390 mPas, an average molecular weight $M_n$ of 19,210 g/mol and a residual Si—OH content of 53 ppm.

Example 7

1500 g of siloxane 1 were mixed at room temperature with 10.02 g of silane 1 and 120 mg of catalyst 1. In a first step, the reaction mixture was degassed at 20° C. for 10 minutes and 250 hPa while stirring. Subsequently, the mixture was heated to 120° C. and stirred at a pressure of 2 hPa for 3 h. Finally, the mixture was cooled to 22° C. and vented with nitrogen. A colorless, transparent bisoxamide-functional silicone oil was obtained having an APHA number of 6, a viscosity of 19 Pas, an average molecular weight of 73,200 g/mol and a residual Si—OH content of 76 ppm.

Example 8

400 g of siloxane 2 were mixed at room temperature with 10.46 g of silane 1 and 20 mg of catalyst 1. In a first step, the reaction mixture was degassed at 20° C. for 10 minutes and 250 hPa while stirring. Subsequently, the mixture was heated to 100° C. and stirred at a pressure of 2 hPa for 3 h. Finally, the mixture was cooled to 22° C. and vented with nitrogen. In a final step, 1.0 g of magnesium oxide was added, the mixture was stirred for 20 minutes and the magnesium oxide was filtered off. A colorless, clear, transparent bisethyloxalatoaminopropyl-functional silicone oil was obtained having an APHA number of 6, a viscosity of 1240 mPas, an average molecular weight $M_n$ of 16,860 g/mol and a residual Si—OH content of 112 ppm.

The invention claimed is:

1. A process for preparing amino-oxo-acetate-functional organosiloxanes, comprising reacting
   (A) silanes of the formula (I)

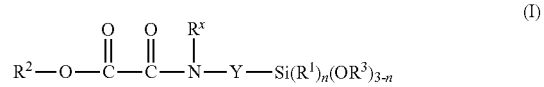

(I)

with
(B) one or more linear siloxanes (B1), cyclic siloxanes (B2) or mixtures thereof:
(B1) linear siloxanes of the formula

$HO[SiR_2O]_rH$      (II)

and
(B2) cyclic compounds of the formula

$(SiR^4_2O)_s$      (III), where
R are identical or different and denote hydrogen or monovalent, optionally substituted, SiC-bonded hydrocarbon radicals optionally interrupted by heteroatoms,
$R^1$ are identical or different and denote monovalent, optionally substituted, SiC-bonded hydrocarbon radicals optionally interrupted by heteroatoms,
Y are identical or different and represent divalent, optionally substituted hydrocarbon radicals optionally interrupted by oxygen atoms,
$R^2$ are identical or different and denote hydrogen, monovalent, or optionally substituted hydrocarbon radicals optionally interrupted by oxygen atoms, $R^3$ are identical or different and denote monovalent, optionally substituted hydrocarbon radicals optionally interrupted by oxygen atoms, $R^4$ are identical or different and denote hydrogen, Si-bonded halogen atoms, Si-bonded hydroxy groups, or monovalent, optionally substituted, SiC-bonded hydrocarbon radicals optionally interrupted by heteroatoms, $R^x$ are identical or different and denote hydrogen or optionally substituted hydrocarbon radicals, n is 0, 1 or 2, s is an integer from 3 to 10 and t is an integer greater than 1, in the presence of (C) catalysts, wherein oxygen is present as a heteroatom in at least one of R, $R^1$, or $R^4$.

2. The process of claim 1, wherein component (B) is a linear siloxane (B1).

3. The process of claim 1, wherein component (B) is present in an amount of 10 to 200 parts by weight, based on 1 part by weight of component (A).

4. The process of claim 2, wherein component (B) is present in an amount of 10 to 200 parts by weight, based on 1 part by weight of component (A).

5. The process of claim 1, wherein catalysts (C) are phosphorus-containing catalysts.

6. The process of claim 1, wherein catalysts (C) are present in amounts of 10 to 10,000 ppm by weight, based on the total amount of components (A) and (B).

7. A process for preparing amino-oxo-acetate-functional organosiloxanes, comprising reacting (A) silanes of the formula (I)

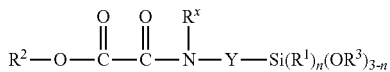

(I)

with (B) one or more linear siloxanes (B1), cyclic siloxanes (B2) or mixtures thereof:

(B1) linear siloxanes of the formula $HO[SiR_2O]_tH$ (II)

and (B2) cyclic compounds of the formula $(SiR^4{}_2O)_s$ (III), where

R are identical or different and denote hydrogen or monovalent, optionally substituted, SiC-bonded hydrocarbon radicals optionally interrupted by heteroatoms, $R^1$ are identical or different and denote monovalent, optionally substituted, SiC-bonded hydrocarbon radicals optionally interrupted by heteroatoms, Y are identical or different and represent divalent, optionally substituted hydrocarbon radicals optionally interrupted by oxygen atoms, $R^2$ are identical or different and denote hydrogen, monovalent, or optionally substituted hydrocarbon radicals optionally interrupted by oxygen atoms, $R^3$ are identical or different and denote monovalent, optionally substituted hydrocarbon radicals optionally interrupted by oxygen atoms, $R^4$ are identical or different and denote hydrogen, Si-bonded halogen atoms, Si-bonded hydroxy groups, or monovalent, optionally substituted, SiC-bonded hydrocarbon radicals optionally interrupted by heteroatoms, $R^x$ are identical or different and denote hydrogen or optionally substituted hydrocarbon radicals, n is 0, 1 or 2, s is an integer from 3 to 10 and t is an integer greater than 1, in the presence of (C) catalysts, wherein the process is conducted under a protective gas.

8. The process of claim 1, which is conducted at a temperature between 0 and 250° C.

9. The process of claim 1, which is conducted at a pressure between 10 hPa and 2000 hPa.

10. The process of claim 1, wherein the amino-oxo-acetate-functional siloxanes have a number average molecular weight Mn of 1000 g/mol to 200,000 g/mol.

11. The process of claim 1, wherein the catalyst is phosphonitrile chloride.

12. The process of claim 1, wherein no cyclic compounds (B2) are employed.

13. The process of claim 12, wherein t is from 1 to 150.

14. The process of claim 1, wherein the amino-oxo-acetate-functional organosiloxanes have a number average molecular weight in the range of 2500 g/mol to 50,000 g/mol.

* * * * *